Jan. 12, 1971   S. J. BUCKMAN ET AL   3,554,917
FINISH REMOVER COMPOSITION
Filed Jan. 30, 1968   3 Sheets-Sheet 1

PAINTED SPECIMEN AFTER TREATMENT WITH
METHYLENE CHLORIDE CONTAINING VARYING
QUANTITIES OF N, N-DIMETHYLAMIDES.
(ALKYD BASED PAINT)

1

2

3

4

5

6

STANLEY J. BUCKMAN
RICHARD T. ROSS
HARRY D. SLAWSON
LESTER A. WIENERT
INVENTORS

BY Floyd Trimble
ATTORNEY

Jan. 12, 1971  S. J. BUCKMAN ET AL  3,554,917
FINISH REMOVER COMPOSITION

Filed Jan. 30, 1968  3 Sheets-Sheet 2

PAINTED SPECIMEN AFTER TREATMENT WITH METHYLENE CHLORIDE CONTAINING VARYING QUANTITIES OF N, N-DIMETHYLAMIDES. (EPOXY ESTER BASED PAINT)

4

3

2

1

STANLEY J. BUCKMAN
RICHARD T. ROSS
HARRY D. SLAWSON
LESTER A. WIENERT
INVENTORS

BY *Floyd Trumble*
ATTORNEY

United States Patent Office 3,554,917
Patented Jan. 12, 1971

3,554,917
FINISH REMOVER COMPOSITION
Stanley J. Buckman, Richard T. Ross, Lester A. Wienert, and Harry D. Slawson, Memphis, Tenn., assignors to Buckman Laboratories, Inc., Memphis, Tenn., a corporation of Tennessee
Filed Jan. 30, 1968, Ser. No. 701,749
Int. Cl. C09d 9/00; C11d 7/52; C23g 5/02
U.S. Cl. 252—171                                13 Claims

ABSTRACT OF THE DISCLOSURE

Compositions comprising methylene chloride and an N,N-dimethylamide of an 18-carbon unsaturated carboxylic acid are efficient paint removers.

---

This invention relates to improved compositions for removing coatings from surfaces and, more particularly, this invention relates to compositions for removing finish coatings such as paints, enamels, varnishes, lacquers, and resins from coated surfaces. Still more particularly, these compositions may be used for stripping such coatings from metal, wood, ceramic materials, and the like.

Compositions for the removal of coatings and adherent resins which are now commercially available include solvent compositions such as methyl ethyl ketone, turpentine, naphtha, etc.; alkali-based compositions including principally those based on sodium hydroxide with a variety of additives; and less widely used compounds for the removal of more resistant coatings including those containing organic acids such as formic acid or lactic acid. The solvent compositions are well known, the alkali-based compositions are typified by those disclosed in U.S. Pat. 2,962,395, issued to Lewis J. Brown, and the organic acid formulations are typified by those disclosed in U.S. Pat. 2,418,138, issued to Howard Packer.

Most modern finish removers incorporate a chlorinated hydrocarbon as the principal solvent for softening and loosening the finish in order to permit its removal. These chlorinated hydrocarbons, a particularly preferred example of which is methylene chloride, do not have the dangerous flammability of the older solvents (such as acetone, benzene, and petroleum naphtha) and are, therefore, preferred over such older solvents. These modern finish removers, however, are not entirely satisfactory even for use in removing surface coatings of common varieties of paint, varnish, and enamel because of their limited stripping ability. They are less satisfactory for removing the new surface coatings recently developed by the organic coating industry.

These new, highly resistant surface coatings including principally those based on epoxies and urethanes cannot be effectively and efficiently removed by the commercial finish removers now available. Widespread and increasing demand for effective removing agents for these highly resistant coatings now exists, particularly in the fields of air transportation and space research where periodic removal of coatings from aircraft and spacecraft is required for purposes of inspection.

The organic solvent type of commercial paint stripper is almost entirely ineffective in removing these new, highly resistant coatings and none of the alkaline strippers remove the highly cross-linked coatings with sufficient efficiency to permit its commercial application. The most active of the organic-acid type paint removers barely soften these coatings.

It is, therefore, a principal object of the present invention to provide a finish remover composition which obviates the disadvantages of such compositions heretofore available.

It is another object of this invention to prepare more efficient finish remover compositions as well as methods of applying such compositions.

Yet another object of our invention is to prepare more efficient finish remover compositions that are based upon low cost and widely available raw materials.

Other objects and advantages of the present invention will become apparent from the following detailed description thereof.

To the accomplishment of the foregoing and related ends, this invention comprises the features hereinafter fully described and particularly pointed out in the claims, the following description setting forth in detail certain illustrative embodiments of this invention. These are indicative, however, of but a few of the various ways in which the principle of the invention may be employed.

Briefly stated, we have discovered that the stripping ability of finish remover compositions in which methylene chloride is used as the principal stripping agent is greatly increased by the presence of a relatively small amount of an N,N-dimethylamide of a straight chain unsaturated carboxylic acid.

Suitable N,N-dimethylamides of straight chain carboxylic acids are those prepared from carboxylic acids containing 18 carbon atoms. The acids are further characterized by having at least one carbon to carbon double bond. Specific acids classified within this category include: oleic, linoleic, linolenic, ricinoleic, and mixtures thereof. Also suitable are the mixed acids found in tall, castor, corn, cottonseed, linseed, olive, peanut, rapeseed, safflower, sesame, and soybean oils. A mixture of carboxylic acids particularly suitable for use in our invention is that available commercially as tall oil fatty acids under the trademark Unitol ACD. A typical analysis of this product is as follows:

TABLE 1

|  | Specification range | Typical analysis |
|---|---|---|
| Fatty acids, percent | 98.8–99.7 | 98.9 |
| Rosin acids, percent | 0.2–0.6 | 0.5 |
| Unsaponifiables, percent | 0.1–0.6 | 0.6 |
| Linoleic acid, percent |  | 45 |
| Oleic acid, percent |  | 51 |
| Saturated acid, percent | 2.0–2.8 | 2.4 |
| Acid number | 198–201 | 199 |
| Saponification number | 198–202 | 200 |
| Color, Gardner | 3—4— | 3+ |
| Viscosity: |  |  |
| SSU, 100° F |  | 105 |
| Gardner, seconds |  | 0.9 |
| Specific gravity, 60° F./60° F |  | 0.905 |
| Titre, ° C | −1–1.0 | 0.0 |
| Flash point, ° F |  | 375 |
| Fire point, ° F |  | 435 |

The dimethylamides of these tall oil fatty acids will hereinafter be referred to as DMA.

As to the amount of the dimethylamides to be added to the finish remover composition, suitable and preferred quantities vary from 0.5 to 20% and 5 to 15%, respectively. The foregoing percentages are by weight, based on the total weight of the methylene chloride plus the dimethylamides. Stated another way, a suitable composition is one that comprises 80 to 99.5 parts by weight of methylene chloride and 20 to 0.5 parts by weight of the dimethylamides. A preferred composition is one comprising 85 to 95 parts by weight of methylene chloride and 15 to 5 parts by weight of the dimethylamides. If it becomes desirable to add other components to the finish remover composition, such as evaporation retardants, thickeners, diluents, organic solvents, water, and emulsifying agents, the amounts of these optional components are not considered in our statement as to suitable and preferred quantities of the dimethylamides used in the composition.

The invention will now be more fully described with reference to specific examples and to the accompanying drawings, of which:

In order to disclose the nature of the invention still more clearly, the following illustrative examples will be given. It is understood, however, that the invention is not to be limited to the specific conditions or details set forth in these examples, except insofar as such limitations are specified in the appended claims.

EXAMPLE 1

The activating effect of DMA on the blistering ability of methylene chloride on an alkyd based paint film applied to test specimens or panels was demonstrated as follows: Galvanized steel specimens were cleaned with mineral spirits as a solvent, dried, and then coated with an alkyd paint. In conducting this experiment, the manufacturer's directions for applying the alkyd paint film were followed. The film was allowed to air dry indoors for 7 days followed by exposure outdoors on a paint test fence for 18 months. Equal volumes of the finish remover compositions identified in Table 2 then were applied by means of a dropper to each of the painted specimens.

TABLE 2

| | Finish remover composition, parts by weight | | |
|---|---|---|---|
| | Methylene chloride | Paraffin | DMA |
| Specimen: | | | |
| 1 | 500 | 10 | 0 |
| 2 | 475 | 10 | 25 |
| 3 | 450 | 10 | 50 |
| 4 | 400 | 10 | 100 |
| 5 | 350 | 10 | 150 |
| 6 | 300 | 10 | 200 |

Figure 1:
FIG. 1 is a photograph of painted (alkyd based paint) test specimens after treatment with methylene chloride plus paraffin wax as an evaporation retardant containing varying quantities of DMA.
Figure 1:
Figure 1:
Figure 1:
Figure 1:
Figure 1:

After 1-hour exposure to the finish remover composition, the surface of the specimens appeared as indicated in the photographs of FIG. 1. These photographs demonstrate that the presence of from about 5 to 20% by weight of DMA markedly enhances the blistering ability of methylene chloride on an alkyd paint film, thus increasing its effectiveness as a paint remover.

EXAMPLE 2

In this example the activating effect of DMA on the blistering ability of methylene chloride on an epoxy ester paint film is demonstrated. Cold-rolled steel specimens were cleaned with mineral spirits as a solvent, dried, and then coated with an epoxy ester based paint. In conducting this experiment, the manufacturer's directions for applying the paint film were followed, after which the paint film was allowed to air dry indoors for 7 days followed by exposure outdoors on a paint test fence for 24 months. Equal volumes of the finish remover composition identified in Table 3 then were applied by means of a dropper to each of the painted specimens.

TABLE 3

| | Finish remover composition, parts by weight | | |
|---|---|---|---|
| | Methylene chloride | Paraffin | DMA |
| Specimen: | | | |
| 1 | 500 | 10 | 0 |
| 2 | 475 | 10 | 25 |
| 3 | 450 | 10 | 50 |
| 4 | 425 | 10 | 75 |

Figure 2:
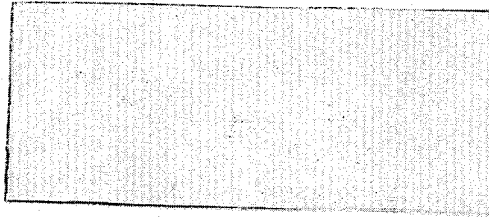
FIG. 2 is a photograph of painted (epoxy ester based paint) test specimens after treatment with methylene chloride plus paraffin wax as an evaporation retardant containing varying quantities of DMA.
Figure 2:
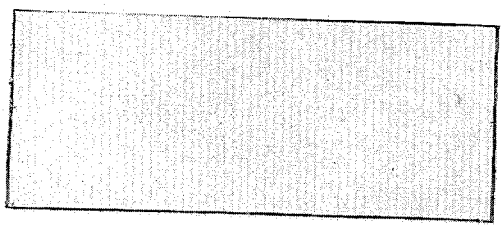
Figure 2:
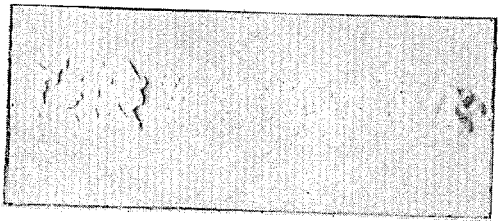
Figure 2:
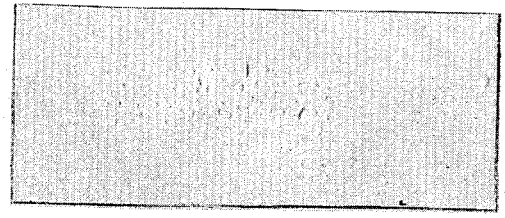

After 30-minute exposure to the finish remover composition, the surface of the specimens appeared as indicated in the photographs of FIG. 2. These photographs demonstrate that 5 to 15% by weight of DMA markedly enhances the blistering ability of methylene chloride on an epoxy ester paint film, thus increasing its effectiveness as a paint remover.

EXAMPLE 3

This example demonstrates that DMA is effective in increasing the blistering ability of methylene chloride on a polyurethane paint film. Cold-rolled steel specimens were cleaned with mineral spirits as a solvent, dried, and then coated with a polyurethane based paint. In conducting this experiment, the manufacturer's directions for applying the paint film were followed, after which the paint film was allowed to air dry indoors for 7 days followed by exposure outdoors on a paint test fence for 48 months. Equal volumes of the finish remover compositions identified in Table 4 then were applied by means of a dropper to each of the painted specimens.

TABLE 4

| | Finish remover composition, parts by weight | | |
|---|---|---|---|
| | Methylene chloride | Paraffin | DMA |
| Specimen: | | | |
| 1 | 500 | 10 | 0 |
| 2 | 475 | 10 | 25 |
| 3 | 450 | 10 | 50 |
| 4 | 400 | 10 | 100 |

Figure 3:
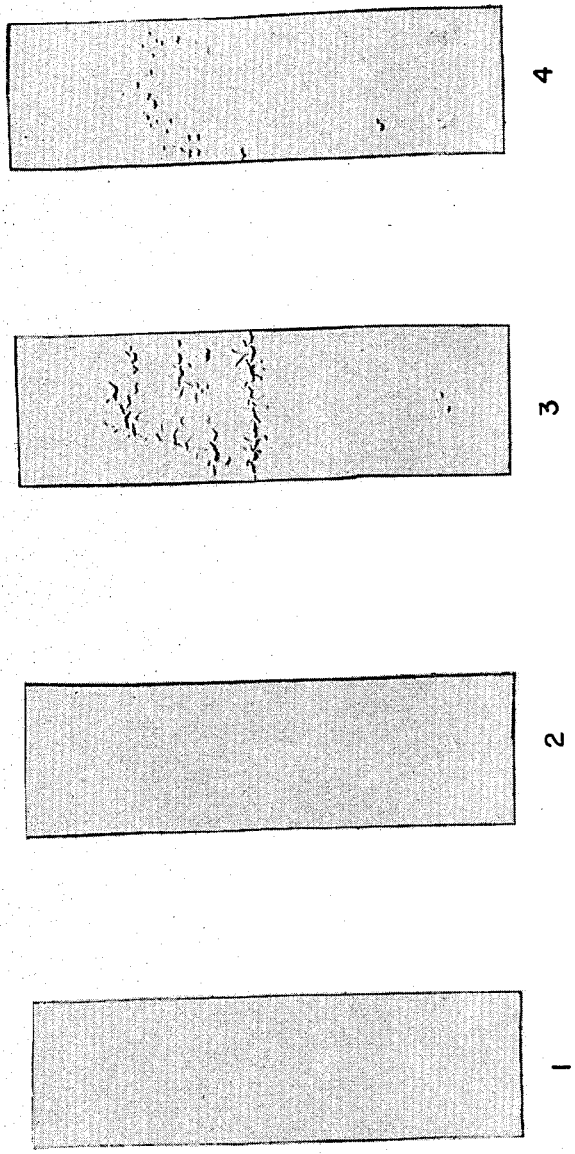
FIG. 3 is a photograph of painted (polyurethane based paint) test specimens after treatment with methylene chloride plus paraffin wax as an evaporation retardant containing varying quantities of DMA.

After 1-hour exposure to the finish remover composition, the surface of the specimens appeared as indicated in the photographs of FIG. 3. These photographs demonstrate that 10 to 20% by weight of DMA markedly enhances the blistering ability of methylene chloride on a polyurethane paint film, thus increasing its effectiveness as a paint remover.

Similar results were obtained when the dimethylamides of the fatty acids previously listed were substituted for DMA.

Similar results were also obtained when the finish remover compositions of our invention were applied to coatings such as styrenated alkyd, butadiene copolymer (water), acrylic lacquer, phenolic (air-dried), oxidizing alkyd, oxidizing epoxy, chlorinated rubber, polyvinyl acetate, styrene butadiene, phenolic-pigmented (air-dried), phenolic epoxy-catalyzed, silicone, and vinyl chloride.

Although we have disclosed a finish remover composition comprising methylene chloride, paraffin wax, and an N,N-dimethylamide of a straight chain unsaturated carboxylic acid containing 18 carbon atoms, it will be understood by those skilled in the art that various other components may be employed as a substitute for the paraffin wax or in addition thereto to make the resulting composition more adaptable to a specific use. For example, stearin or some other waxy substance may be substituted for paraffin wax as the evaporation retardant. Typical additives include toluene, methanol, water, a surface-active agent, triethylammonium phosphate, the latter dissolve in ethyl alcohol as a 40% solution, and a thickener, an example of which is hydroxypropyl methyl cellulose.

The commonly used evaporation retardants are waxy substances such as paraffin or stearin. These substances tend to leave a waxy film or coating on the substratum after the finish remover has been removed by scraping or flushing. Since a paint, varnish, or lacquer coating reapplied to such a surface does not adhere well, special means must be employed to remove the waxy film. Sometimes this is difficult. To overcome this difficulty, we may employ as the evaporation retardant in the composition of our invention a nonwaxy compound such as mannitan stearate or sorbitan stearate.

While particular embodiments of the invention have been described, it will be understood, of course, that the invention is not limited thereto since many modifications may be made as will be understood by those skilled in the art. For example, greater quantities of the N,N-dimethylamides may be used (up to 50% by weight and even more) with beneficial results if the finish remover is allowed to remain on the painted surface for a period of several hours or more. It is, therefore, contemplated to cover by the appended claims such modifications as fall within the true spirit and scope of the invention.

We claim:

1. A finish remover composition consisting essentially of 80 to 99.5 parts by weight of methylene chloride and from 20 to 0.5 parts by weight of an N,N-dimethylamide of a straight chain carboxylic acid wherein said carboxylic acid contains 18 carbon atoms and at least one carbon to carbon double bond, characterized in that the total parts by weight of the said two components is equal to 100.

2. The finish remover composition of claim 1 wherein the methylene chloride content varies from 85 to 95 parts by weight and that of the N,N-dimethylamide varies from 15 to 5 parts by weight, characterized in that the total parts by weight of the said two components is equal to 100.

3. The finish remover composition of claim 1 wherein the straight chain carboxylic acid is a mixture of straight chain carboxylic acids containing 18 carbon atoms and at least one carbon to carbon double bond.

4. The finish remover composition of claim 1 wherein the straight chain carboxylic acid is a mixture of acids derived from tall oil.

5. The finish remover composition of claim 1 wherein the straight chain carboxylic acid is a mixture of acids derived from linseed oil.

6. The finish remover composition of claim 1 wherein the straight chain carboxylic acid is a mixture of acids derived from cottonseed oil.

7. The finish remover composition of claim 1 wherein the straight chain carboxylic acid is a mixture derived from cottonseed oil.

8. The finish remover composition of claim 1 wherein the straight chain carboxylic acid is a mixture of acids derived from corn oil.

9. The finish remover composition of claim 1 wherein the straight chain carboxylic acid is a mixture of acids derived from peanut oil.

10. The finish remover composition of claim 1 wherein the N,N-dimethylamide is N,N-dimethyloleamide.

11. The finish remover composition of claim 1 wherein the N,N-dimethylamide is N,N-dimethyllinoleamide.

12. The finish remover composition of claim 1 wherein the N,N-dimethylamide is N,N-dimethyllinolenamide.

13. The finish remover composition of claim 1 wherein the N,N-dimethylamide is N,N-dimethylricinoleamide.

References Cited

UNITED STATES PATENTS

| 2,058,013 | 10/1936 | Henke et al. | 260—404 |
| 2,094,609 | 10/1937 | Kritchevsky | 252—171 |
| 2,443,173 | 6/1948 | Baum | 252—171 |
| 3,094,491 | 6/1963 | Greminger, Jr., et al. | 252—171 |
| 3,199,989 | 8/1965 | Buckman et al. | 106—311 |

FOREIGN PATENTS

| 818,331 | 8/1959 | Great Britain | 134—38 |

LEON D. ROSDOL, Primary Examiner

W. E. SCHULZ, Assistant Examiner

U.S. Cl. X.R.

134—38; 252—364